Sept. 29, 1964         H. BECKMANN         3,150,497
METHOD AND DEVICE FOR DEEP FREEZING OF
FOODS, LUXURIES AND MEDICINES Filed June 6, 1961         4 Sheets-Sheet 4

INVENTOR.

HANS BECKMANN

BY

Harness, Dickey & Pierce

ATTORNEYS

United States Patent Office 3,150,497
Patented Sept. 29, 1964

3,150,497
METHOD AND DEVICE FOR DEEP FREEZING OF FOODS, LUXURIES AND MEDICINES
Hans Beckmann, Rutschbahn 7, Hamburg 13, Germany
Filed June 6, 1961, Ser. No. 115,126
Claims priority, application Germany June 8, 1960
8 Claims. (Cl. 62—64)

The invention relates to a process for deep freezing of goods, luxuries and medicines, wherein the goods proper will be called in the following also the material to be cooled. Furthermore, the invention relates to the devices for carrying out the process.

It is an object of the invention to provide a process and device for deep freezing in which the bacterial and autolytical decomposition of the cooled material will be largely impeded by cooling, the material then being deep frozen in a rapid manner while being practically free of any gas or air enclosures which might retard heat transfer from the material.

It is another object to provide an improved deep freezing process of this type which is extremely efficient and quick, and which is capable of working with small temperature differentials and thus extremely economically, without destruction of the cellular structure or accumulation of ice crystals.

It is another object to provide an improved deep freezing process and apparatus of this character which avoids water freezing problems normally associated with refrigeration expansion valves having small cross sections, and in which no nozzles are present which might become clogged due to water freezing.

It is another object to provide an improved deep freezing process and apparatus having these characteristics, which may use various freezing agents such as brine or refrigerants.

It is a further object of the invention to provide an improved deep freezing apparatus and process which is capable of deep freezing material in a packed condition in such a manner that the deep freezing takes place after the material has been deaerated, and degassed, and precooled, so that heat transfer during the deep freezing process will remain excellent and bacterial, enzymatic and chemical processes will be impeded during deep freezing by the absence of the air and gases.

Further improvements and suitable embodiments of the invention are explained in connection with the attached drawing, in which a few embodiments of the invention are shown in a simplified manner.

In the drawings,

FIG. 3 is a schematic representation of a degasification and cooling container in accordance with the invention for degassing, deaerating and cooling, under a high vacuum, a material to be cooled contained in still open packing containers, and for closing and sealing the packing containers under the same high vacuum, FIG. 4 is perspective representation of a foil in which a plurality of tub-like recesses has been formed especially in a vacuum deep drawing process for the reception of material to be cooled.

Figure 1:
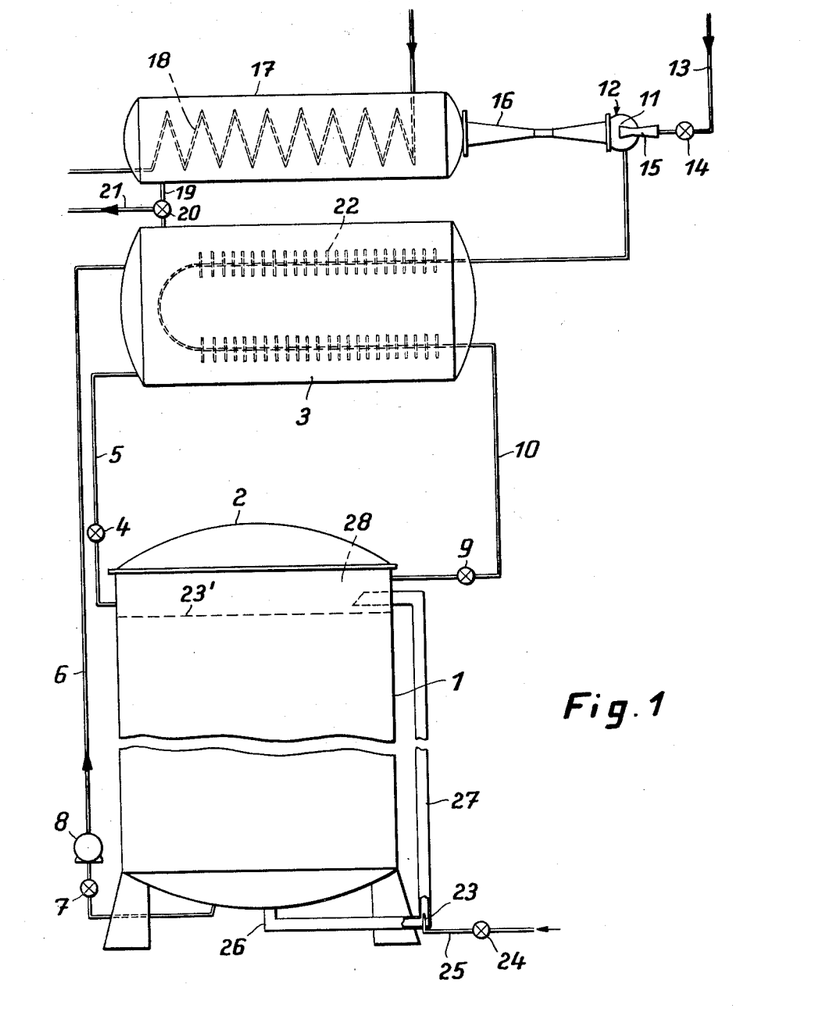
FIG. 1 is a schematic representation of the device for deep freezing foods, luxuries and medicines using a brine as liquid freezing agent in accordance with the invention.

In the embodiment of the invention according to FIG. 1, there is provided a vacuum container 1 which is adapted to be closed by means of a cover 2. In addition to the vacuum container 1, there is provided a brine storage container 3 which is preferably arranged above the vacuum container 1. The brine container 3 is in communication with the vacuum container 1 via a conduit 5 provided with a shut-off valve 4. Furthermore, a conduit 6 in which there is arranged a shut-off valve 7 and a brine pump 8, extends from the bottom of the vacuum container 1 into the brine container 3.

A conduit 10 provided with a shut-off valve 9 extends from the top portion of the vacuum container 1 to the mixing chamber 11 of a steam jet 12. The steam jet 12 is supplied with steam via a conduit 13 provided with a shut-off valve 14. The steam leaving the conduit 13 via a nozzle 15 is adapted to suck on air and water vapor in a manner known per se which are supplied thereto from the vacuum container 1 via the conduit 10, whereby the vacuum container 1 may be evacuated. The water vapor and air mixture sucked on is compressed in the diffuser 16 subsequent to the mixing chamber 11 and supplied to a condenser 17, where the water vapor is condensed by means of a cooling coil 18 through which cooling water flows. A portion of the condensed water is returned to the brine storage container 3 through the conduit 19 while the excess condensate is carried away into the open atmosphere through a valve 20 with three passages to connect container 3 or condenser 17 or both with a conduit 21. The air of the water vapor and air mixture which has been delivered by the water steam jet 12 is continuously carried away into the open air in a manner known per se.

In order to carry out the process in accordance with the invention, the vacuum container 1 is at first filled with the material to be cooled with the cover 2 of the container removed, the material to be cooled being placed into the container in such a manner that there are remaining small interstices between the individual units of the material to be cooled. After the cover 2 has been closed airtightly, the valves 9 and 14 are opened whereby the water steam jet 12 is set to work and placed into communication with the interior of the vacuum container 1.

The interior of the vacuum container is in this manner subjected to a vacuum of at least 10 mm. mercury column, preferably of about 1–4 mm. mercury column. The connection 19 between the condenser 17 and the brine storage container is closed in this operation, in that the whole of the condensed water is carried off into the open.

The container 3 holds a supply of brine which is precooled if possible, i.e. a supply of an aqueous salt solution or an alcohol and water mixture. Suitably, the connection 10 is passed through the brine storage container 3 and is provided here with heat exchanger surfaces 22. Owing to the dissolving chill, the brine initially was under a lower temperature which is naturally dependent on the concentration of the brine and the type of the salt selected or the alcohol of higher valence. With higher concentration, the brine may at the beginning have a temperature of about −30° C. Owing to the fact that the conduit 10 is conducted over the surfaces 22 in heat exchanging relation with the brine, the gases and vapors sucked from the interior of the vacuum container 1 by means of the steam jet are cooled whereby the steam consumption of the steam jet is reduced and the evacuation of the water container 1 is accelerated. If the brine has warmed up during the process, the very cold gases or vapors sucked-off are effecting a recooling of the brine; this will be the case, even as a rule, because the temperature of the brine will very quickly rise to about ambient temperature by heat exchange.

After the desired vacuum of preferably 1 to 4 mm. mercury column has been reached inside the vacuum container 1, the valve 4 will be opened so that now the brine from the container 3 enters into the vacuuum container 1 via the conduit 5. When the liquid level 23' in the container has been reached, at which the whole material to be cooled is covered by the liquid brine, the valve 4 is closed again.

The steam jet 12 now continuously maintains the desired vacuum of about 1 to 4 mm. mercury column in the container 1, so that in this manner as already described, a formation of vapor takes place also at the surface of the material to be cooled situated in the liquid brine, whereby an extremely extensive and quick cooling of the material to be cooled is obtained. In a manner which is not shown in more detail such a portion of the condensed water being formed in the condenser 17 is returned to the interior of the container 1 in such an amount as to maintain substantially constant the concentration of the brine therein. This may be effected in a simple manner in that the flowing back of the condensed water to the vacuum container 1 is controlled in dependence upon the concentration of the brine in the vacuum container.

The cooling of the material in the container 1 is furthermore considerably increased by the fact that the liquid brine in the container 1 is circulated. This is suitably effected by means of a fluid biased nozzle 23 which in a manner known per set sucks on the liquid brine and returns it to the container 1. In the embodiment, the nozzle 23 is biased with compressed air which is supplied to it through a conduit 25 provided with a valve 24. The nozzle 23 is arranged outside of the container 1, it sucks brine from the lower portion of the container 1 via a conduit 26 and delivers it—mixed with air—back to the vapor chamber 28 of the container via a conduit 27. The small amount of air flowing into the container in this manner is also sucked off by the steam jet 12.

After the material to be cooled has been deep frozen to about −20° C. in this manner, the valves 9 to 14 are closed. Thereupon the valve 7 is opened and the brine is pumped back from the container 1 into the brine container 3 by means of the brine pump 8 and through the conduit 6. It is obvious that prior thereto, also the valve 24 has been closed in order to stop the circulation pump installation. The container 1 may now be communicated with the atmosphere and the cover 2 removed, in order to take the deep frozen material to be cooled out of it if it is not desired to leave the material to be cooled in the container 1 in a manner to be described in the following so as to use the container 1 also for storage of the material to be cooled over a longer period of time.

If the material to be cooled cannot be brought into direct contact with the brine, the material to be cooled must be packed in containers that are adapted to be closed which, however, are to be closed only after the material to be cooled has been degassed, deaerated and precooled by the application of a vacuum of at least 10 mm. mercury column and preferably of 1 to 4 mm. mercury column, without being frozen. The pretreatment may however also be carried on until a freezing occurs. This may for instance be effected in such a manner that the material to be cooled is charged into packing containers which are tight with respect to water vapor, liquids and gases, and the packing containers thus filled with the material to be cooled are inserted into the container 1 while still being open. After closure and evacuation of the container 1, and prior to the introduction of the brine, these packing containers which are tight with respect to water vapor, liquids and gases, are automatically closed. It is, however, also possible in a manner to be described more fully hereinafter, to carry through these operational steps outside of the container 1, so that nothing is changed in the sequence of the process just described but that the material to be cooled is introduced into the container 1 already in a degassed, deaerated condition and packed. In this case, when starting the operation of the device in accordance with FIG. 1, only the more or less moist air which is present inside the container 1 in the surroundings of the packed material to be cooled is sucked off from the container 1 by means of the steam jet 12.

In the embodiment according to FIG. 2, there is again provided a vacuum container which in this figure is referenced 29, while its removable cover bears the reference numeral 30. This device is operated with a refrigerant, a liquid gas or a liquefied gas, preferably with an inert gas. The liquid refrigerant or liquefied gas is received by the refrigerant accumulator 31 to which the liquid refrigerant flows from a refrigerant condenser 33 via a conduit 32.

Figure 2:
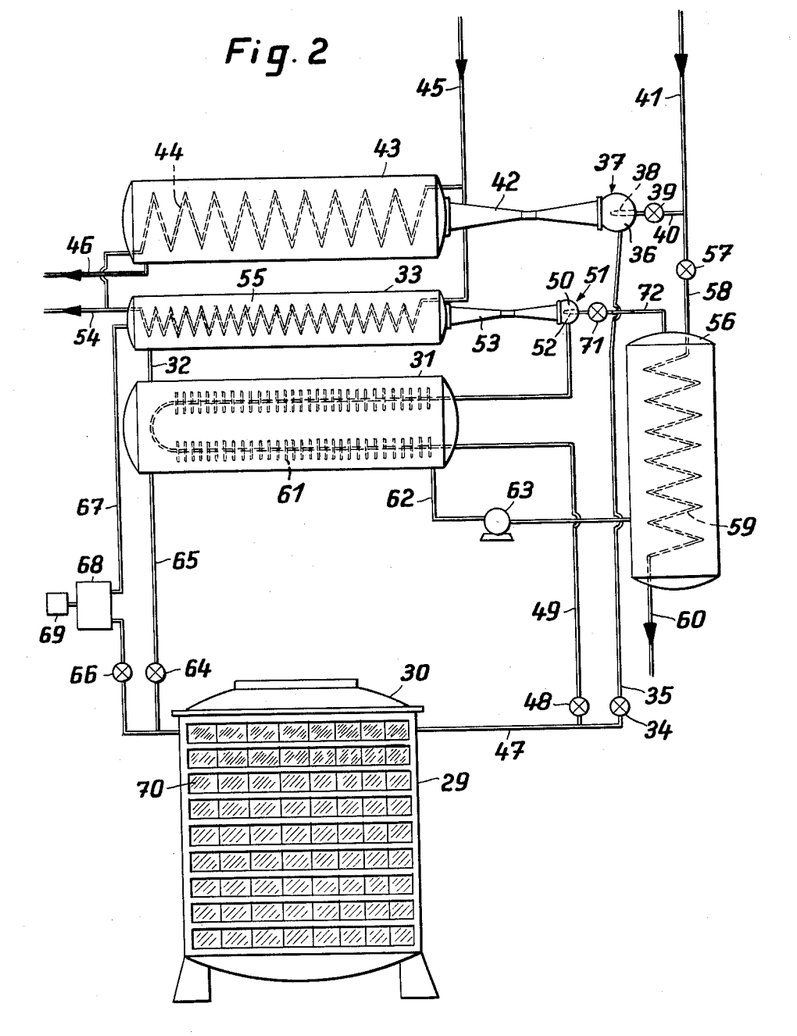
FIG. 2 is a schematic representation of a device in accordance with the invention for deep freezing foods, luxuries and medicines employing a refrigerant, a liquid gas or a gas capable of being liquefied as a liquid freezing agent.

The upper portion of the container 29 is in communication with the mixing chamber 36 of a water steam jet 37 via a conduit 35 provided with a shut-off valve 34. The driving nozzle 38 of the steam jet is in communication with a steam pressure source 41 via a conduit 40 provided with a shut-off device 39. The delivered mixture of the steam jet is compressed in a manner known per se in a diffuser 42 and condensed in a condenser 43 which is cooled by a cooling coil 44 through which cooling water flows. The cooling water proper flows to the cooling coil 44 through a conduit 45. The condensate forming in the condenser 43 is carried off in a manner which is not shown in more detail, through a conduit 46. In a similar manner, also the removal of the proportion of air present in the condenser and coming from the steam and air mixture conveyed by the jet 37 is effected.

The conduit 35 which is leading to the steam jet 37 is in communication with the upper side of the container 29 via a conduit 47. To this conduit 47, a conduit 49 is also connected through a shut-off valve 48 which conduit leads to the mixing chamber 50 of a refrigerant jet 51. The driving nozzle 52 of the coolant jet 53 is driven by means of refrigerant vapor which is generated in a manner to be described more fully hereinafter. The delivered mixture of the refrigerant jet 51 is compressed in a diffuser 53 in a manner known per se and condensed in the refrigerant condenser 33, i.e. condensed to form a liquid refrigerant. The cooling water for cooling the refrigerant condenser 33 is likewise supplied through the conduit 45 and carried off through the conduit 54 after it has flown through the cooling coil 55 provided in the refrigerant condenser.

The refrigerant vapor for actuating the refrigerant jet 51 is generated in a refrigerant vapor generator 56, which consists of a vessel-like container serving to receive liquid refrigerant up to a certain liquid level which is not shown in detail. The heating of this refrigerant vapor generator is effected by means of steam which is taken from the source 41 through a conduit 58 provided with a shut-off valve 57. The conduit 58 leads into a heating coil 59 which is arranged inside the refrigerant vapor generator 56 and by means of which the heating of the refrigerant is effected. The conduit 59 terminates in a condensed water conduit 60 through which the condensed steam is withdrawn in a manner not described in a more detailed manner.

The conduit 49 which leads to the refrigerant jet 51 is passed through the refrigerant accumulator 31 and is provided there with surfaces 61 suited for heat exchange. From the refrigerant accumulator 31 there extends in addition a conduit 62 with a feed pump 63 arranged therein, to the interior of the refrigerant vapor generator 56. The refrigerant feeding pump 63 is controlled in dependence upon the liquid level in the refrigerant vapor generator 56.

The refrigerant accumulator 31 is in addition connected with the inside of the container 29 through the conduit 65 provided with a shut-off valve 64, which container 29 is finally in communication with the inside of the refrigerant condenser 33 through a conduit 67 provided with a shut-off valve 66. In this conduit 67, there is interposed a compressor 68 as it is used in refrigerating machines having a relatively small output and which may be driven for instance by means of an electric motor 69. The conduit 67 may be extended also to a separate refrigerant condenser which is in a position of cooling and liquefying a relatively small amount of vaporous refrigerant compressed by the compressor 68.

Let us assume that the device is operated for instance with 1,2,2-trifluortrichlorethane ($CFCl_2$—$CF_2Cl$) as a refrigerant. The total process will then take place under a vacuum. Such refrigerants may without any hestitation be brought into contact with the material to be cooled itself. When starting the process, the liquid refrigerant is located in the refrigerant accumulator 31.

The goods itself are, as is schematically shown in FIG. 2, arranged in various layers 70 within the container 29. For this, auxiliary dishes may be arranged in the container in superimposed arrangement, with the aid of which the material to be cooled may also be removed again from out of the container. It is however also possible to pile the material to be cooled directly within the container, in which case care has only to be taken that between the individual units of the material to be cooled, small interstices are remaining.

After the introduction of the material to be cooled, the container 29 is sealed vacuum-tightly by means of the cover 30. Thereupon the valves 34 and 39 are opened, whereby the container 29 is brought into communication with steam jet 37. By means of this jet, the goods are now degassed and deaerated. At the same time, a cooling is effected down to about 0° C. by evaporation of the water present on the surface of the material to be cooled without the material to be cooled being frozen. If the goods intended to be frozen are already in this stage at approximately —1 to —4° C., then this process will be carried out for a correspondingly longer period of time.

The steam jet 37 is now switched off and the connection thereof with the interior of the container 29 is interrupted, in that the valves 34 and 39 are closed.

Now the valve 64 will be opened, so that the liquid refrigerant is reaching the vacuum container 29 from the refrigerant accumulator 31 through the conduit 65, substantially unthrottled. This is continued until the whole material to be cooled in the container 29 is substantially covered with the liquid refrigerant.

In addition, a valve 71 is opened which connects the driving nozzle 52 of the refrigerant jet 51 with the refrigerant vapor generator 56 through a conduit 72 after the valve 57 has already been opened prior thereto, in order to generate a refrigerant vapor of a sufficiently high pressure in the refrigerant vapor generator 56.

In that now by opening the valve 48 the vapor chamber of the container 29 is connected with the refrigerant jet 51, with the valve 64 being closed, the refrigerant vapors forming in the container 29 are sucked-off, wherein at the same time the high vacuum in the container is maintained. Owing to the high volumetric efficiency of the jet 51, the contents of refrigerant in the container 29 will evaporate extremely rapidly and a very intensive cooling effect will be obtained directly on the material to be cooled without any additional transfer stages.

After the total liquid contents of the container 29 have been evaporated in this manner, the valves 48 and 71 are closed for a short period of time. By opening the valve 64, liquid refrigerant is again admitted into the container 29 substantially unthrottled. This process must however be repeated several times in dependence upon the goods to be treated and the deep freezing temperature to be obtained, wherein generally a deep freezing temperature of about —20° C. will have to be taken into consideration.

The vaporized refrigerant which has been compressed in the diffuser is now liquefied in a manner known per se by being cooled in the refrigerant condenser, whereupon it flows to the refrigerant accumulator 31 via the conduit 32. With the aid of the heat exchanger 61, the liquid refrigerant in the refrigerant accumulator 31 is precooled by means of the refrigerant vapors sucked-off from the container 29, wherein a precooling may be contemplated to approximately —1° C.

As soon as the freezing has been brought to the desired temperature and the whole of the refrigerant has been withdrawn from the container 29, the valves 48 and 71 will be closed; the steam supply valve 57 may then also be closed. The valve 64 for the supply of liquid refrigerant to the container 29 had already been closed before. Now the valve 66 is opened and the compressor 68 is started. This small type compressor sucks the last remainders of the coolant vapor from the container 29 and urges the compressed vapors into a condenser, for instance the condenser 33, where the vapors are liquefied and will be ready for further refrigeration.

Now, the cover 30 may be opened and the goods be removed if the container 29 is not to be used again for storing the material to be cooled.

The process described with the aid of FIG. 2 may also be modified in that prior to the first introduction of the liquid refrigerant into the container 29, the material to be cooled itself is coated with a thin ice layer protecting the material to be cooled from a direct contact with the refrigerant. For this purpose, care should be taken that the individual units of the material to be cooled are coated with a thin layer of water during the evacuation of the container 29 or at least shortly before the completion of this evacuation by means of the steam jet 37. This may be effected by moistening the units of the material to be cooled sufficiently with water already prior to starting the evacuation. It is however also possible to moisten the material to be cooled on the surface thereof just prior to the completion of the evacuation by the additional supply of water in a manner which is not shown in more detail. In any case, it is recommendable to use sterilized water for this moistening operation in order to avoid an additional introduction of detrimental germs into the container. In order that at the end of the evacuation the moist surface of the material to be cooled may be transformed into a self-contained layer of ice it is recommendable to decrease the vacuum rapidly by a certain amount, for instance, from 4 mm. to 2 mm. mercury column. The heat withdrawal resulting from this increased evaporation is then so strong and so sudden that the moist surface layer of the material to be cooled is spontaneously caused to freeze, without the heat present in the material to be cooled proper having time enough to follow and prevent a freezing of the moist surface layer.

Such an ice layer will however form also owing to the liquid refrigerant being introduced into the container 29 very rapidly after evacuation by means of the steam jet 37. It has already been pointed out that the liquid coolant flows into the container substantially unthrottled through the large cross sectional areas of the conduit 65 and the valve 64. In order to contribute favourably to a rapid inflow of the coolant into the container 29, the cross sectional areas 65 and the valves 64 must therefore be dimensioned amply. In addition, it may be advisable in this connection even to provide a pump in the conduit 65 to assist the accelerated inflow of the refrigerant into the container 29 and therewith the conversion of the moist surface of the material to be cooled into a layer of ice.

FIGURES 3 and 4 illustrate a process and schematically show a device with the aid of which it is possible to introduce some sort of material to be cooled into a packing container prior to the actual deep freezing, then, by creating a high vacuum, to degas, deaerate and eventually cool it and thereupon to close the packing container and start the actual deep freezing operation. It is obvious that the packing container must be made of a material which is tight with respect to gas, water vapors and liquids. Suitably, for the production of such packing containers, foils and in particular coated foils may be used, wherein as a material for the foils preferably synthetic materials, as plastic and thermo-plastic materials, and light weight metals are to be contemplated.

In accordance with FIGURE 4, a plurality of individual recesses 73 are formed, in particular by a vacuum deep drawing process, within such a foil 74. Principally, one proceeds in this known vacuum deep drawing process in such a manner that the foil 74 is placed above a corresponding mold and then heated. After having been plasticized by sufficiently heating it, a vacuum is applied thereto from below the mold which draws the foil into the respective mold shape. In this manner a palette is forming with a plurality of boxes or tubs provided therein into which now the material to be cooled is filled. In the representation of FIGURE 4, the foil 74 has a square basic shape. It is, however, generally recommended to give it a circular configuration as suitably the foil will be placed later on into the containers 1 or 29 described above. In this case, the basic shape of the foil 74 is thus but little smaller than that of the inner cross section of the containers 1 or 29.

The degassing and cooling container of FIG. 3 consists of a base member 75 and a cover 76. With the aid of circumferentially extending flanges 77 and 78, the base member 75 and the cover 76 may be closed vacuum-tightly with respect to one another in a manner which is not shown in more detail.

The base member 75 is designed in correspondence to the foil 74. It also shows a number of recesses 79, which are capable of fitting into the recesses 73 of the foil with little clearance, as is shown in more detail in FIG. 3. Now, a foil 80 is placed on the foil 74, in the tubs of which the material to be cooled has been filled, which foil 80 is designed to be substantially even. In the embodiment given by way of example the material for the foil 74 and the foil 80 is selected to be such that it is well adapted for welding. For instance a polyethylene foil backed with a foil of a cellulose derivative is used.

In the cover 76, a welding apparatus 82 for instance a high frequency welder is supported on a spindle 81. This welding apparatus is in a position to form a tight welded seam around the individual tubs or boxes 73 between the foils 74 and 80 as indicated at 83. By means of the spindle 81, which is passed through the cover 76 in a vacuum-tight manner, the whole welding apparatus may be lifted and lowered. Also magnetically or mechanically operated closure devices which are fastened below the cover, may be used.

Additionally, the inside of the degassing and cooling container consisting of the two portions 75 and 76 is to be subjected to a high vacuum of at least 10 mm., preferably 1 to 4 mm. mercury column, by means of the connection 84.

After the foil 80 has been loosely placed on the palette 74 provided with boxes or tubs, the individual boxes or tubs 73 of which are filled with the material to be cooled, the cover 76 will be put on and closed vacuum-tightly. Thereupon the interior of the containers 75, 76 is connected to a vacuum source, in particular a steam jet pump, through the conduit 84; the design of said pump may be basically the same as steam jet pump 12 in FIG. 1 and 37 in FIG. 2. In this manner, the material to be cooled is largely degassed, deareated and precooled, under certain circumstances down to freezing temperature. Now the welding apparatus 82 is lowered onto the foil 80 far enough by means of the spindle 81 and the foil 80 welded around the individual boxes 73 together with the foil 74 in a vacuum-tight manner. Instead of the welding, for instance, cementing may be employed.

Thereupon, the container may be opened by removal of the cover 76, whereupon suitably the whole foil 74 is taken out together with the plurality of the containers 73 which are now closed vacuum-tightly, and introduced into the container 1 of FIG. 1 or the container 29 of FIG. 2, so that the degassed, deaerated, precooled and packed material to be cooled may there be deep-frozen. There again, the container 1 or 29 is subjected in the first line to a high vacuum of at least 10 mm. and suitably 1 to 4 mm. mercury column, in order to start thereafter the deep freezing process by means of the brine or the refrigerant. Also with the material to be cooled being packed in this manner, there will result an excellent heat transfer during the deep freezing process. Under certain circumstances it is recommendable to deaerate and pack the material to be cooled with a vacuum slightly higher than that under which the deep freezing is carried out. A difference of about 1 mm. mercury column, for instance, or an even lesser one will suffice to ensure that the walls of the packing container will lie especially close to the material to be cooled in the interior thereof, thus guaranteeing an excellent heat transfer and especially the formation of vapor of the refrigerant or brine at the outer surface of the packing container during the deep freezing under vacuum.

Figure 5:
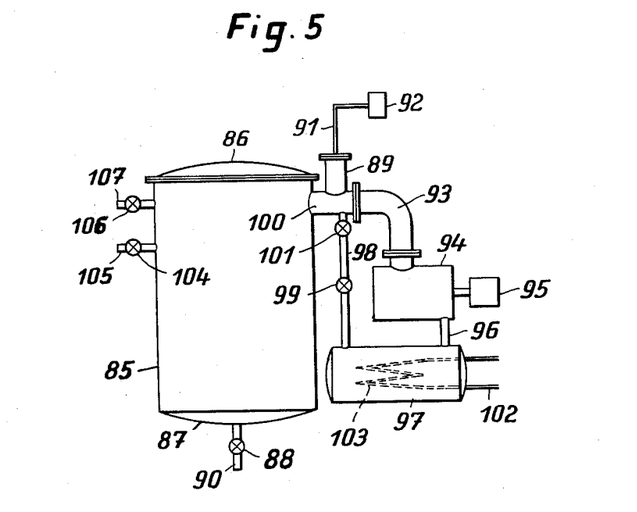
FIG. 5 is a schematic representation of a vacuum container, which after the deep freezing process, likewise is used as a storage container for storing the deep-frozen material to be cooled.

With reference to FIG. 5 it is particularly illustrated how the containers which are under a vacuum, after carrying out the deep freezing process, may be used also for storing the material to be cooled. Of course, it is also possible to remove the material to be cooled from the vacuum container required therefor after completion of the deep freezing process and to place it into a container which is exclusively destined for storing the material to be cooled. According to FIG. 5, a container adapted to be subjected to vacuum is referenced 85, while its cover bears the reference numeral 86. A conduit 90 provided with a shut-off valve 88 extends from the bottom 87 of the container. A vacuum source 92 is connected via a connecting pipe 89 and a conduit 91, said vacuum source consisting of a steam jet air ejector to which may be added also a vacuum air pump. The inside of the container 85 is connected with the connecting pipe of a compressor 94 via a conduit 93, which compressor is driven through a motor 95. The discharge side of the compressor 94 is connected with a container 97 via a conduit 96, the container 97 being connected to a connection pipe 100 via a conduit 98 having a shut-off device 99 arranged therein, with the connection pipe 100 leading directly into the container. At the end of the conduit 98, there is provided an expansion valve 101 as is usually arranged between the condenser and the evaporator when designing refrigerators. The inside of the container 97 may be cooled in particular with cooling water through a conduit 102 having a cooling coil 103 arranged in sequence.

To the container 85 there is also connected a conduit 105 provided with a shut-off valve 104 through which conduit 105 for instance water may be admitted into the container.

The interior of the container in which there is located the material to be cooled, is subjected for instance to a pressure of 1–4 mm. mercury column, which pressure may stem either from the preceding deep freezing or have been generated in a manner known per se by means of the vacuum source 92. Now, for instance, refrigerant may be introduced into the container over a conduit 107 provided with a shut-off device 106, until a pressure of for instance about 760 mm. mercury column is achieved therein. Thereupon, the compressor 94 is started which now sucks the refrigerant from the container and urges it into the container 97 until a pressure of for instance about 30 mm. mercury column is obtained in the container 85. By loading the line 102–103 with cooling water, the refrigerant compressed by the compressor 94 to for instance about 2–10 atmospheric-pressure-units and thus heated, is cooled down to for instance about 0–10° C. The refrigerant subjected to an overpressure in the container and cooled, is now, after the compressor 94 has been put to a standstill, admitted into the container 85 through the expansion valve 101, with the shut-off device 99 being opened. Owing to the expansion, the gases are strongly cooling down and are now in a position of dissipating the heat radiation from outside which had caused slight warming up of the material to be cooled.

Here, again it must be taken into consideration that although the cooling down of the gases owing to the expansion is very strong, it is true, there will nevertheless be no perceptible influence on the material to be cooled but only the heat radiated in from outside will be dissipated because the heat content of gases is but very low. As an example, the following figures are given assuming that air is used. Owing to its oxygen content, however, air may be used within the boundaries of the process of this invention only if the material to be cooled within the container has been packed in containers which are tight with respect to water vapors, liquid and gases. If the compressor 94 has compressed the gas to a value of 3 atmospheres and the air in the accumulator 97 is cooled down to 15° C. and if furthermore the pressure in the container 85, on opening the expansion valve 101, is equal to about 30 mm. mercury column, the air will cool down to about −60° C. owing to the expansion.

After the pressure in the container 85 has risen again to about 760 mm. mercury column (the container is now completely filled with gas), the process described is repeated in that the compressor is set to work. This operation for carrying off the heat entering from outside by radiation thus is an intermittent one. This includes the advantage that owing to the continuous pressure changes, the cooled gases will enter into all the interstices between the units of the material to be cooled.

Figure 6:
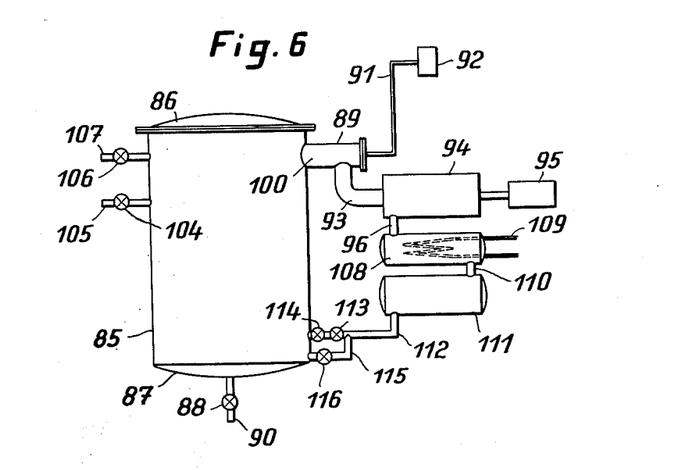
FIG. 6 is a schematic representation of another vacuum container which after completion of the deep freezing process likewise serves to store the deep-frozen material to be cooled.

The container of FIG. 6 is like that of FIG. 5 in many details, so that in FIG. 6 the same reference numerals as in FIG. 5 have been used to designate corresponding parts. The conduit 96 branching from the pressure connection of the compressor 94, however, terminates in a condenser 108 which is provided with a cooling coil 109 through which for instance cooling water flows. The condenser 108 thus represents a water-cooled heat exchanger. From the condenser 108, a conduit 110 branches to a liquid accumulator 111 which again is connected with the interior of the container 85 through a conduit 112, a shut-off device 113 and an expansion valve 114 connected at the end thereof. The valve 114 is an expansion valve of the type as is usually provided between the condenser and the evaporator of a refrigeration plant.

Furthermore, a conduit 115 having arranged therein a shut-off device 116, extends from a point before the shut-off device 113 in the conduit 112 likewise to the inside of the container 85.

With the aid of FIG. 6 it is schematically shown, how a container may be used for both deep freezing and storing the material to be cooled.

In the deep freezing process, the container 85 is subjected to a vacuum of at least 10 mm. and preferably 1–4 mm. mercury column in a manner which has been described above in more detail, by means of the vacuum source 92, whereby the material to be cooled is degassed, deaerated and cooled down to about −1° C. to +1° C. unless the material to be cooled has been packed before into tight packing containers under a vacuum, for instance in accordance with FIGS. 3 and 4.

After opening the valve 106, a liquid refrigerant for instance difluordichlorethane, trifluortrichlorethane or a similar refrigerant is introduced into the container 85 through the conduit 107 having a large cross section, substantially unthrottled and to such an extent that the material to be cooled is flooded by the liquid refrigerant. With the valves 113 and 116 being closed, and with the vacuum source 92 at rest and the refrigerant compressor 94 being in operation, the pressure of the refrigerant within the container 85 is reduced by evaporation to a value, which corresponds to a certain decrease in temperature in comparison to that the material to be cooled had, when this stage of the process was started.

In this operation, the refrigerant is sucked in by the compressor 94 and compressed, liquefied in the condenser 108 and accumulated in the accumulator 111. When the just mentioned pressure corresponding to a certain decrease in temperature of the material to be cooled has been obtained, the valve 113 will be opened and the liquefied refrigerant from the accumulator 111 arrives anew in the container 85 substantially unthrottled, where it will then again flood the material to be cooled. This step of the process is effected when the compressor 94 is put to a standstill.

Now, the compressor 94 is set to work again, wherein with the valves 113 and 116 being closed, vapor is sucked in anew from the container 85 until substantially the whole of the liquid refrigerant in the container 85 has been evaporated or until a pressure has been reached which corresponds to a certain decrease in temperature compared with that which the material to be cooled had at the beginning of this period of sucking-in of the compressor.

These steps of the process are repeated until a desired cooling, freezing or deep freezing of the goods has been obtained. Finally, i.e. when the desired temperature of for instance −20° C. for the material to be cooled has been achieved, the refrigerant vapor is sucked off as far as possible, for instance up to 1–2 mm. mercury column by means of the compressor 94.

Regarding the subsequent storing of the material to be cooled within the container 85 the point only is that the heat introduced by radiation is dissipated again. This is effected in such a manner that now the operation is carried out continuously only with a vaporous coolant. For this purpose the shut-off valve 116 is closed and the shut-off valve 113 opened. The liquid refrigerant from the accumulator 111 now obtains in the interior of the container 85 the vaporous condition over the expansion valve 114. The refrigerant compressor 94 is continuously in operation and maintains the vacuum inside the container. The circulation of the refrigerant serves the purpose of dissipating the small amount of heat introduced by radiation. The refrigerant always present in the container 85 in the evaporated condition, is thus in this operation continuously sucked in by the compressor 94 through the conduit 93 and carried to the condenser 109 through the conduit 96, where the refrigerant vapors are cooled down and liquefied. They flow now through the conduit 110 to the liquid accumulator 111 and are returned to the container 85 through the conduit 112, the open shut-off valve 113 and the expansion valve 114. Here they vaporize at a pressure in the interior of the container of for instance about 300 mm. mercury column, and are then sucked in again by the refrigerant compressor 94 in a continuous operation, and the process will continue in the manner as described. In this operation for dissipating the heat introduced by radiation, the container 85 thus is always under a pressure which is essentially higher than the vacuum which had been necessary for obtaining the degassed and de-aerated condition of the material to be cooled and its deep freezing.

Many modifications of the process are possible. For carrying out a deep freezing operation by means of a refrigerant or a liquefied gas, suitably a refrigerant jet is always used as has been described in connection with part 51 of FIG. 2. The refrigerant vapor necessary for the operation of this jet is suitably always generated by direct heating in a refrigerant vapor generator similar to part 59 of FIGURE 2, as for instance the pressure of the vapor of 1,2,2-trifluortrichlorethane $CFC_{12}$—$CF_2Cl$ will achieve a value of 4.5 ata. at a temperature of 100° C.

which is a value especially suitable for the operation of a vapor jet.

At the beginning of a deep freezing process as has been illustrated in connection with FIGS. 2 and 6, there will be present in the container 29 or 85 a very small amount of steam which, after the introduction of the liquid refrigerant and the strong cooling down which takes place immediately with the evaporation of the refrigerant, will take the form of snow. In this operation it may happen that a portion of frozen steam is carried away with the circuit so that, to prevent an objectionable accumulation of water in the coolant, water separators or drying means, respectively must be provided in the pipings in a manner not shown in more detail.

This invention serves in particular for the deep freezing of fish, meat and other preferably fat and albumin containing foods without, however, being restricted to these sorts of food. The invention may also be used for the deep freezing of milk, cream, butter, eggs, the eggs in particular having to be treated in a condition when having no shells. But also a deep freezing of fruits and vegetables in accordance with the invention may be contemplated in particular in such a form that the fruits and vegetables are packed in tight containers under a vacuum prior to carrying out the deep freezing operation proper.

Another field of application of the invention are the fruit juices and fruit aromas. In the field of remedies and medicines special mention may be made of the blood preserves as a particular field of application of the invention.

When carrying out the deep freezing operation with the aid of a refrigerant, the pressures resulting in the intermittent process are largely dependent on the type of refrigerant and the temperatures arising in the freezing apparatus. If, for instance, trifluortrichlorethane is used, then the pressures in the range of temperatures involved here of about +30° to −20° C. are lying completely within the vacuum range. At a temperature of +30° C., this refrigerant will have a pressure of 0.552 atmospheres absolute while at a pressure of −20° C., this coolant will be under a pressure of 0.0518 atmospheres absolute. The corresponding values for difluordichlormethane $CF_2Cl_2$ are 7.5 atmospheres absolute and 1.5 atmospheres absolute, and for monofluortrichlormethane $CFCl_3$ they are 1.2 atmospheres absolute and 0.16 atmosphere absolute.

If now the refrigerant is used in the manner as described only to carry off the heat entering by radiation, the supply of refrigerant through the expansion valve may be controlled such that inside the container there will by no means form any pressures in excess of 760 mm. mercury column. In the deep freezing process it is especially important that the formation of ice itself is effected quickly, that means that the time interval until reaching a temperature of about −4° to −5° C. is as short as possible. In this manner, only small ice crystals are forming so that destruction of the cellular structure of the material to be cooled are avoided. Contrary thereto, the freezing from about −4° C. to −5° C. down to the desired deep freezing temperature may be effected slowly without impairing the quality of the material to be cooled.

In case, in accordance with FIG. 2, a brine or an alcohol and water mixture is used as a liquid freezing agent, in connection with deeper temperatures, the creation of the vacuum may cause costs that cannot be justified from an economical point of view in that, for instance, in connection with deeper temperatures, the steam consumption of the water steam ejector 12 will become very high. In order to avoid this drawback, a modification of the process may be effected in that the described deep freezing process is carried through only down to temperatures of say −4 to −5° C. When the material to be cooled has reached this temperature, the further cooling of the material to be cooled down to the deep freezing temperature of say −20° C. is effected in that the heat is withdrawn from the brine or the alcohol and water mixture present in the container 1 no longer by means of an installation to create a vacuum but by means of a refrigerating machine. For this purpose, then, the steam ejector 12 need only be put to a standstill at the desired temperature which is assumed to be −4 to −5° C. The brine or alcohol and water mixture is now conducted to a heat exchanger arranged outside the container 1 in a manner not shown in detail, said heat exchanger being designed as an evaporator of a special refrigerating machine and in which the brine or the alcohol and water mixture is recooled. In the recooled condition, the brine or the alcohol and water mixture is returned to the container 1 and will now cool the material to the desired deep freezing temperature.

What I claim is:

1. A method for deep freezing materials such as foods, luxuries and medicines having in combination the steps of subjecting said material to a high vacuum of at least 10 mm. mercury column, preferably of about 1–4 mm. mercury column in a container adapted to be closed, cooling said material at said high vacuum to a temperature of about 0° C., introducing a liquid freezing agent substantially unthrottled into said container in such an amount that said material is approximately covered by said freezing agent, sucking off the vapor forming from said freezing agent out of said container, regaining at least a part of said freezing agent in known manner by compressing, cooling, expanding and reliquefying at least a portion of said vapor and returning the regained freezing agent substantially unthrottled into said container.

2. Method for deep freezing material such as foods, luxuries and medicines having in combination the steps of subjecting said material to a high vacuum of at least 10 mm. mercury column, preferably of about 1–4 mm. mercury column in a container adapted to be closed, cooling said material at said high vacuum to a temperature of about 0° C., introducing a liquid freezing brine such as an aqueous salt solution of a mixture of water and higher molecular alcohol substantially unthrottled into said container in such an amount that said material is approximately covered by said liquid freezing brine, sucking off the vapor forming from said freezing brine out of said container, regaining at least a part of said freezing brine in known manner by compressing, cooling, expanding and reliquefying at least a portion of said vapor and returning the regained freezing brine substantially unthrottled into said container.

3. A method for deep freezing material such as foods, luxuries and medicines having in combination the steps of subjecting said material to a high vacuum of at least 10 mm. mercury column, preferably of about 1–4 mm. mercury column in a container adapted to be closed, introducing a liquid freezing brine substantially unthrottled into said container in such an amount that said material is approximately covered by said liquid freezing brine, sucking off the vapor forming from said liquid freezing brine out of said container by means of a stream ejector operated with steam, condensing the steam mixture discharged by said steam ejector by cooling said mixture, returning a portion of said condensed mixture substantially unthrottled to said container for maintaining the concentration of said brine in said container substantially constant.

4. In an installation for deep freezing material such as foods, luxuries and medicines, a first container adapted to be closed, a cover adapted to vacuum-tightly close said first container, a second container adapted to receive a store of liquid brine, a steam ejector, means for supplying said steam ejector with live steam under pressure, means for cooling the steam mixture discharged by said steam ejector, first conduit means including a first valve for connecting the mixing chamber of said steam ejector with the upper part of said first container, second conduit means including a second valve for connecting said second container with said first container, third conduit means including a third valve and a pump for connecting the lower part of said first container with said second container.

5. A method for deep freezing material such as foods, luxuries and medicines having in combination the steps of inserting said material into an open receptacle made of a fluid-tight plastic foil, loosely putting a cover made of a fluid-tight plastic foil in registry upon said receptacle, subjecting said material received by said receptacle to a high vacuum of at least 10 mm. mercury column, preferably of about 1–4 mm. mercury column in a first container to be closed, sealing said receptacle tightly to said cover by a welding process while being subjected to said vacuum, removing said sealed receptacle containing said material out of said first container, subjecting said receptacle to a high vacuum of at least 10 mm. mercury column, preferably of about 1–4 mm. mercury column in a second container adapted to be closed, introducing a liquid freezing agent substantially unthrottled into said second container in such an amount that said receptacle is approximately covered by said liquid freezing agent, sucking off the vapor forming from said freezing agent from said second container, compressing said freezing agent vapor outside said second container, liquefying at least a portion of said compressed vapor, and returning said liquefied freezing agent vapor substantially unthrottled into said second container.

6. In an installation for deep freezing material such as foods, luxuries and medicines, a first container adapted to be closed, a cover adapted to vacuum-tightly close said first container, a second container adapted to receive a store of liquid refrigerant, a steam ejector, a source of live steam under pressure, means for supplying said steam ejector with live steam under pressure from said live steam source, means for cooling the steam mixture discharged by said steam ejector, a refrigerant vapor ejector, a source of pressurized refrigerant vapor, means for condensing the refrigerant vapor discharged by said refrigerant vapor ejector, first conduit means including a first valve for connecting said steam ejector with said first container, second conduit means including a second valve for connecting said second container with said first container, a refrigerant condenser, third conduit means including a third valve and a refrigerating machine for connecting said first container with said refrigerant condenser, and fourth conduit means including a fourth valve for connecting said first container with said refrigerant vapor ejector.

7. In an installation for deep freezing material such as foods, luxuries and medicines, a first container adapted to be closed, a cover adapted to vacuum-tightly close said first container, a second container adapted to receive a store of liquid refrigerant, a vacuum source, a refrigerant vapor suction and compression device, a heat exchanger for condensing compressed refrigerant vapor by cooling, first conduit means for connecting said vacuum source with said first container, second conduit means for connecting the suction side of said suction and compression device with said first container, third conduit means for connecting the delivery side of said suction and compression device with said heat exchanger, fourth conduit means for connecting the lower side of said heat exchanger with said second container, fifth conduit means including a first shut-off valve for connecting the lower side of said second container with said first container, and sixth conduit means including a second shut-off valve and an expansion valve for connecting the lower side of said second container with said first container, said expansion valve being arranged between said second shut-off valve and said first container.

8. The method according to claim 1 in which the steps of introducing the liquid freezing agent, sucking off the vapors formed, compressing, cooling, expanding and reliquefying and returning the regained freezing agent into the container are repeated until said material has attained the desired deep freezing temperature, and the further steps of then removing said liquid freezing agent from said container and storing said material in said container.

References Cited in the file of this patent
UNITED STATES PATENTS

| | | |
|---|---|---|
| 1,890,282 | Droescher | Dec. 6, 1932 |
| 2,502,527 | McFarlan | Apr. 4, 1950 |
| 2,507,632 | Hickman | May 16, 1950 |
| 2,621,492 | Beardsley | Dec. 16, 1952 |
| 2,787,141 | Julius | Apr. 2, 1957 |
| 2,901,891 | Morrison | Sept. 1, 1959 |
| 2,959,034 | Morrison | Nov. 8, 1960 |
| 2,969,649 | Morrison | Jan. 31, 1961 |